US008529808B2

(12) United States Patent
Sandler et al.

(10) Patent No.: US 8,529,808 B2
(45) Date of Patent: Sep. 10, 2013

(54) NANOPOROUS POLYMER FOAMS

(75) Inventors: Jan Kurt Walter Sandler, Heidelberg (DE); Timothy Francis, Mannheim (DE); Pedro Manuel Sampaio Lopes, Mannheim (DE)

(73) Assignee: BASF SE (DE)

( * ) Notice: Subject to any disclaimer, the term of this patent is extended or adjusted under 35 U.S.C. 154(b) by 76 days.

(21) Appl. No.: 13/112,120

(22) Filed: May 20, 2011

(65) Prior Publication Data

US 2011/0287260 A1 Nov. 24, 2011

Related U.S. Application Data

(60) Provisional application No. 61/346,913, filed on May 21, 2010.

(51) Int. Cl.
*C08J 9/04* (2006.01)

(52) U.S. Cl.
USPC ................................ 264/51; 264/41; 264/140

(58) Field of Classification Search
USPC ............................................ 264/41, 51, 140
See application file for complete search history.

(56) References Cited

U.S. PATENT DOCUMENTS

| | | | | |
|---|---|---|---|---|
| 3,760,047 | A * | 9/1973 | Gaeth et al. | 264/54 |
| 4,001,360 | A * | 1/1977 | Davis et al. | 264/49 |
| 4,923,651 | A * | 5/1990 | Hill | 264/45.1 |
| 5,000,991 | A * | 3/1991 | Hayashi et al. | 428/36.5 |
| 5,158,986 | A * | 10/1992 | Cha et al. | 521/82 |
| 5,334,356 | A * | 8/1994 | Baldwin et al. | 422/133 |
| 5,955,511 | A | 9/1999 | Handa et al. | |
| 2003/0034580 | A1 * | 2/2003 | Sasaki et al. | 264/51 |
| 2006/0273482 | A1 * | 12/2006 | Kobayashi et al. | 264/41 |
| 2009/0130420 | A1 * | 5/2009 | Thiagarajan et al. | 428/221 |
| 2009/0134541 | A1 * | 5/2009 | Okamoto et al. | 264/41 |
| 2009/0148665 | A1 * | 6/2009 | Thiagarajan et al. | 428/159 |
| 2011/0288181 | A1 * | 11/2011 | Koltzenburg et al. | 514/772.1 |

FOREIGN PATENT DOCUMENTS

| | | | |
|---|---|---|---|
| EP | 1424124 | A1 | 6/2004 |
| WO | WO-2008087559 | A2 | 7/2008 |

OTHER PUBLICATIONS

Fujimoto, Y., et al., "Well-Controlled Biodegradable Nanocomposite Foams: From Microcellular to Nanocellular," Macromolecular Rapid Communications (May 7, 2003), vol. 24, No. 7, pp. 457-461.

International Search Report, PCT/EP2011/058238, dated Jul. 18, 2011.

Sun, X., et al., "Investigation on the Cell Nucleation and Cell Growth in Microcellular Foaming by Means of Temperature Quenching," Journal of Applied Polymer Science (Jul. 5, 2004), vol. 93, No. 5, pp. 163-171.

Zirkel, L., "Foaming of thin films of a fluorinated ethylene propylene copolymer using supercritical carbon dioxide," Journal of Supercritical Fluids (May 1, 2009) vol. 49, No. 1, pp. 103-110.

* cited by examiner

*Primary Examiner* — Christina Johnson
*Assistant Examiner* — Saeed Huda
(74) *Attorney, Agent, or Firm* — Novak Druce Connolly Bove + Quigg LLP

(57) ABSTRACT

Process for the production of nanoporous polymer foams, comprising the stages a) loading of a single-phase, thermoplastic polymer melt with a gas under a pressure and at a temperature at which the gas is in the supercritical state, b) heating of the laden polymer melt to a temperature which lies in the range from 40° C. under to 40° C. over the glass transition temperature of the unladen polymer melt determinable by means of DSC according to DIN-ISO 11357-2 at a heating rate of 20 K/min, c) depressurization of the polymer melt loaded in stage a) and heated in stage b) with a depressurization rate in the range from 15,000 to 200,000 MPa/sec, and the nanoporous polymer foams with a cell count in the range from 1,000 to 100,000 cells/mm and a density in the range from 10 to 500 kg/m$^3$ obtainable according to the process.

14 Claims, 6 Drawing Sheets

1.00um

NANOPOROUS POLYMER FOAMS

CROSS-REFERENCE TO RELATED APPLICATIONS

This application claims benefit of provisional application 61/346,913, filed May 21, 2010 which is incorporated by reference.

BACKGROUND OF THE INVENTION

The present invention relates to processes for the production of nanoporous polymer foams by depressurization and nanoporous foams obtainable thereby.

It is generally known that foamed plastics can be produced by extrusion of melts containing volatile propellants.

Thus in "Polymer Engineering and Science", Vol. 38, No. 7, 1998, M. Lee et al. describe the extrusion of foamed polyethylene/polystyrene blends with supercritical carbon dioxide.

Particularly in the thermal insulation field, foams are used as insulating material. Since the mean free path of air is about 60 to 100 nanometers (depending on pressure and temperature), it can be concluded from this that in a polymer foam with air as the cell gas at an average cell size of less than or equal to 60 to 100 nanometers the contribution of the cell gas to the total thermal conduction of the foam is significantly reduced or even completely eliminated. Hence foams with as small-celled a structure as possible are especially desirable.

However it must be noted not only that the attainment of such a small cell size is important, but also that the foam density must be reduced as far as possible, in order not to lose the advantage gained via the cell gas through an increased contribution of the polymer matrix to the total thermal conduction. This means that a nanoporous foam must also have as low a density as possible in order to have an improved thermal insulating action compared to standard polymer foams.

In addition there is the problem that very small cell sizes can indeed often be present directly after the foaming, but then a maturation takes place with the formation of larger cells.

For example, in U.S. Pat. No. 5,955,511 and in EP-A 1 424 124 processes for the production of micro- and nanoporous polymer foams are described, in which in a first step a polymer is loaded with a propellant under pressure at low temperatures below the glass transition temperature of the polymer. After depressurization without foaming, this laden polymer is then foamed in a separate step by increasing the temperature.

In WO2008/087559, continuous extrusion processes for the production of nanoporous polymer foams are described, in which a polymer is admittedly exposed to the propellant at different temperatures under pressure, but the subsequent foaming process by depressurization is performed at very low temperatures far below the glass transition temperature of the pure polymer but above the glass transition temperature of the gas-laden system.

In US2009/0130420, a continuous extrusion process for the production of nanoporous polymer foams is described, in which a polymer melt is loaded with a propellant under pressure and is foamed by subsequent depressurization likewise in the region of the glass transition temperature of the gas-laden melt. Admittedly, high process pressures up to 1000 MPa are stated here for the loading, however the stated depressurization rate of 10 to 1000 MPa/s in combination with the low temperatures once again leads to a comparatively high foam density.

However, not only do the processes described have process technology disadvantages, but the product properties also reveal a need for further optimization.

The systems produced are often microporous or macroporous. Here "microporous" means that the pore sizes lie in the range from 1 to 1000 micrometers. The term "macroporous" designates dimensions greater than 1000 micrometers.

Hence the purpose of the present invention is to find processes for the production of nanoporous polymer foams with improved application technology properties, which enable deliberate adjustment of the cell size and the foam density with high and designated precision. Further, the processes should be simpler to perform than the known processes.

BRIEF SUMMARY OF THE INVENTION

Accordingly, a process for the production of nanoporous polymer foams was found, comprising the stages a) loading of a polymer melt formed from thermoplastic polymers with a propellant under a pressure and at a temperature at which the propellant is in the supercritical state,
b) heating of the laden polymer melt to a temperature which lies in the range from −40 to +40° C. around the glass transition temperature of the pure polymer,
c) depressurization of the polymer melt laden in stage a) is effected at a depressurization rate in the range from 15,000 to 2,000,000 MPa/sec, and optionally
d) comminuting the nanoporous polymer foam obtained in stage c) to foam particles having an average particle diameter in the range from 10 μm to 10 mm.

A BRIEF DESCRIPTION OF THE FIGURES

DETAILED DESCRIPTION OF THE INVENTION

Figure 1:
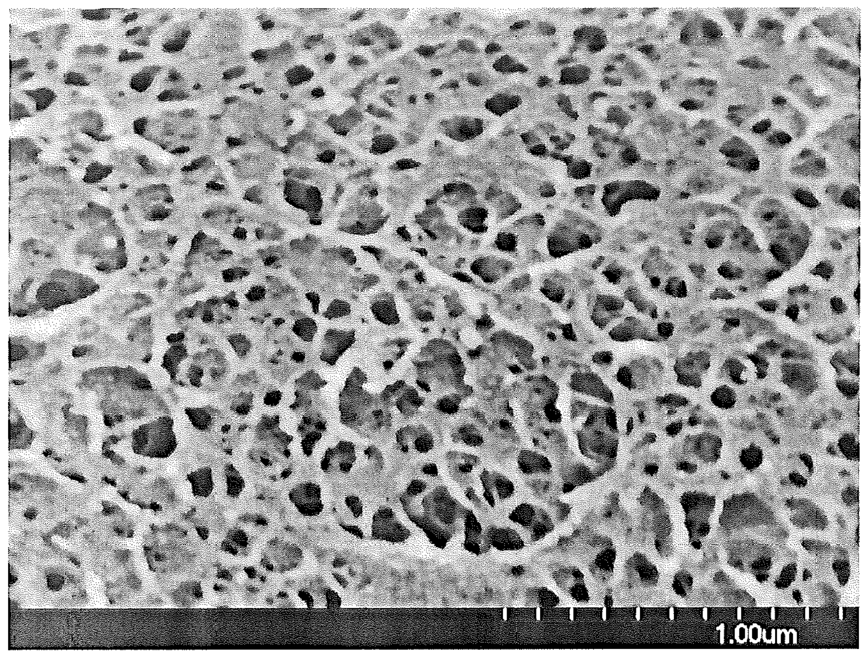
FIG. 1 illustrates a scanning electron micrograph of the nanoporous foam from example 1.
Figure 2:
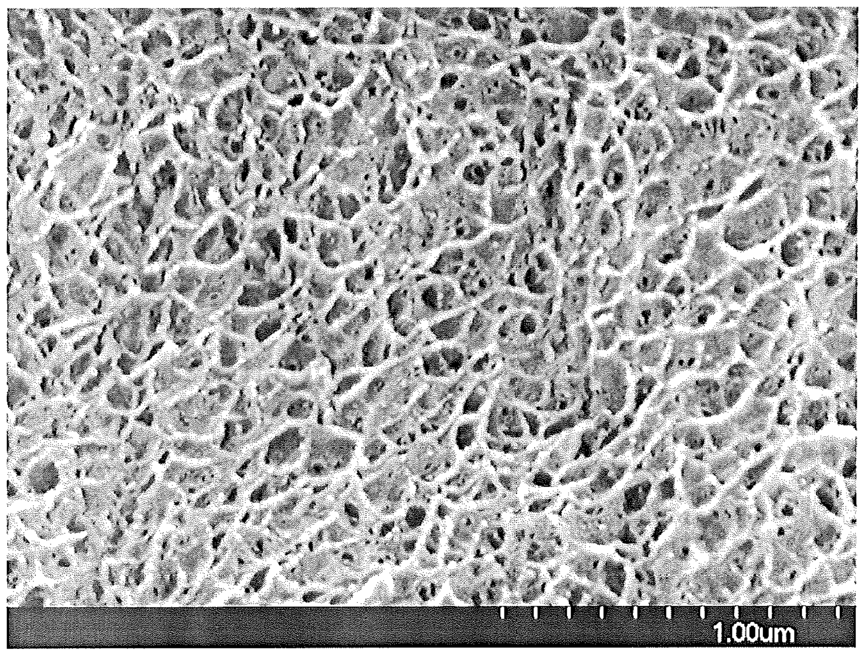
FIG. 2 illustrates a scanning electron micrograph of the nanoporous foam from example 2.
Figure 3:
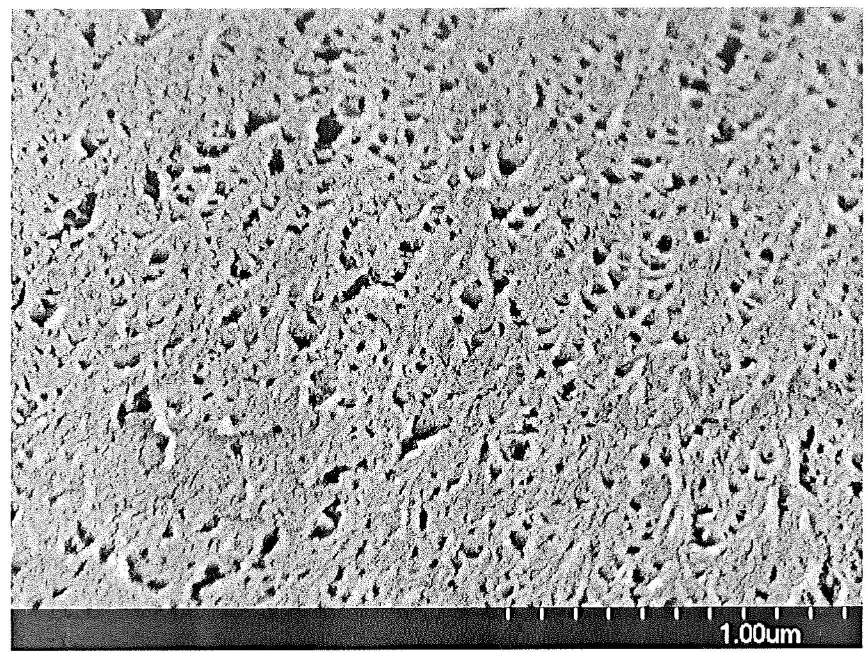
FIG. 3 illustrates a scanning electron micrograph of the nanoporous foam from example 3.
Figure 4:
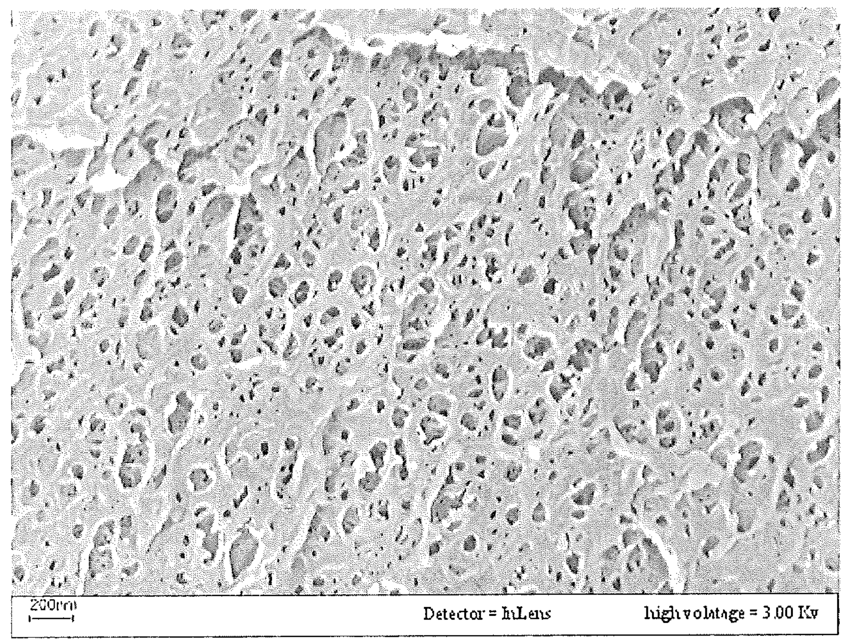
FIG. 4 illustrates a scanning electron micrograph of the nanoporous foam from example 4.
Figure 5:
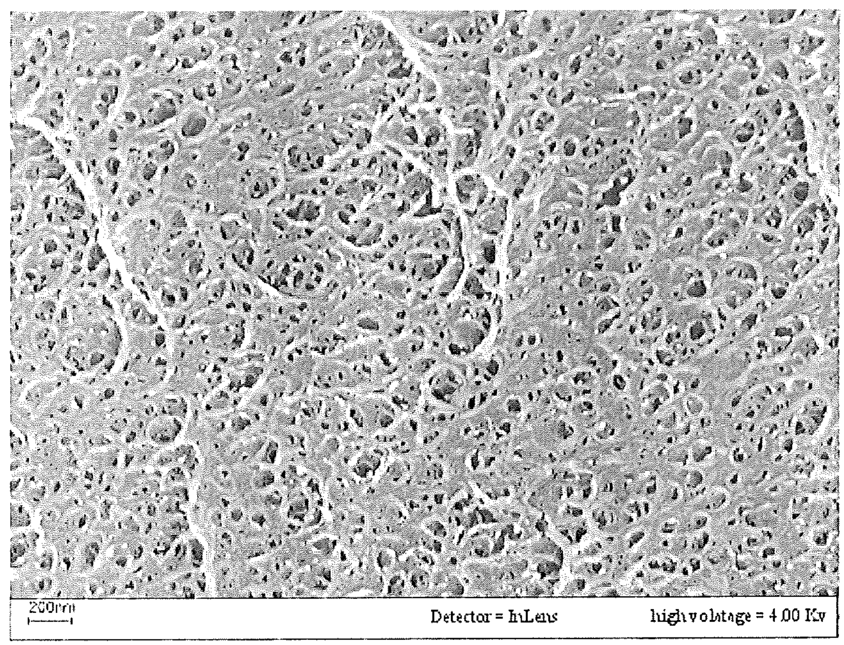
FIG. 5 illustrates a scanning electron micrograph of the nanoporous foam from example 5.
Figure 6:
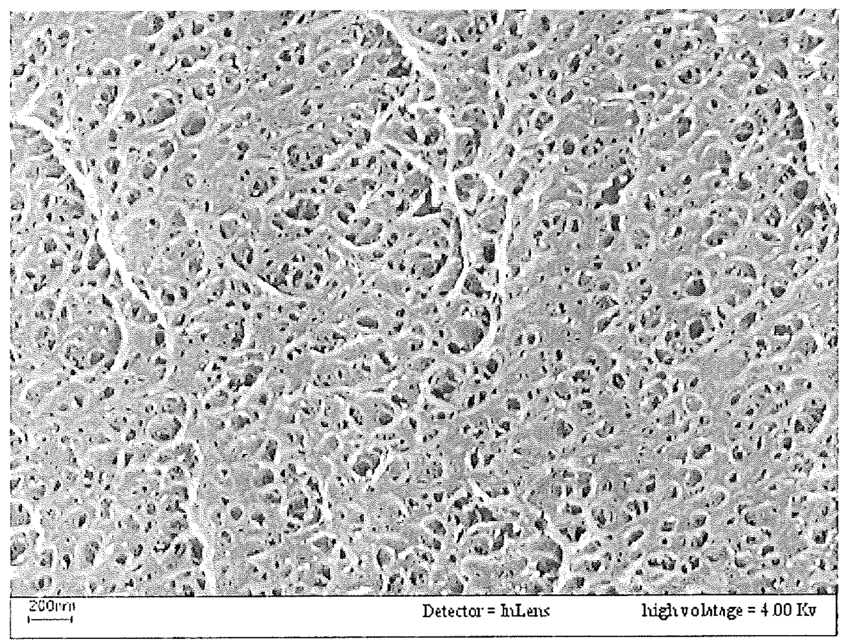
FIG. 6 illustrates a scanning electron micrograph of the nanoporous foam from example 6.
Figure 7:
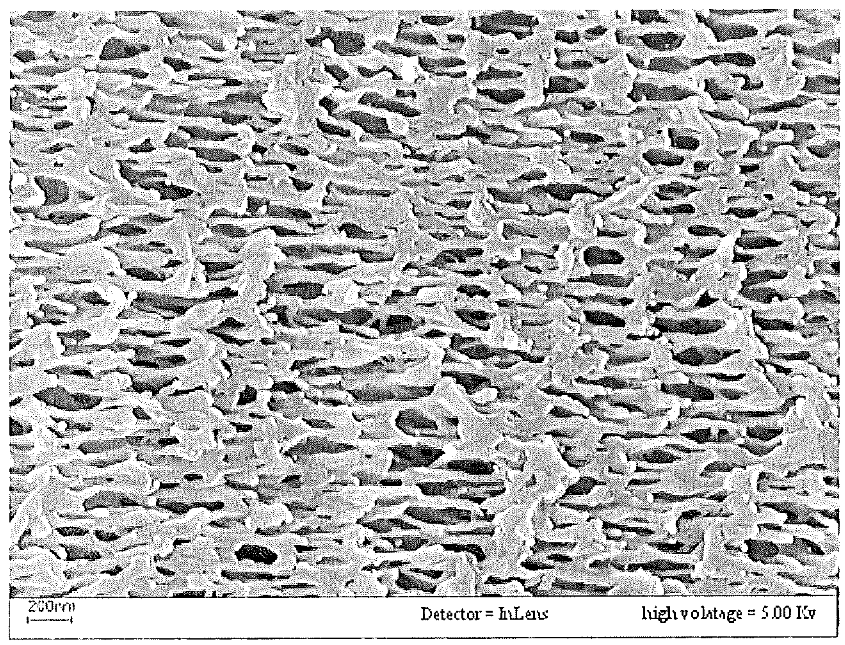
FIG. 7 illustrates a scanning electron micrograph of the nanoporous foam from example 7.
Figure 8:
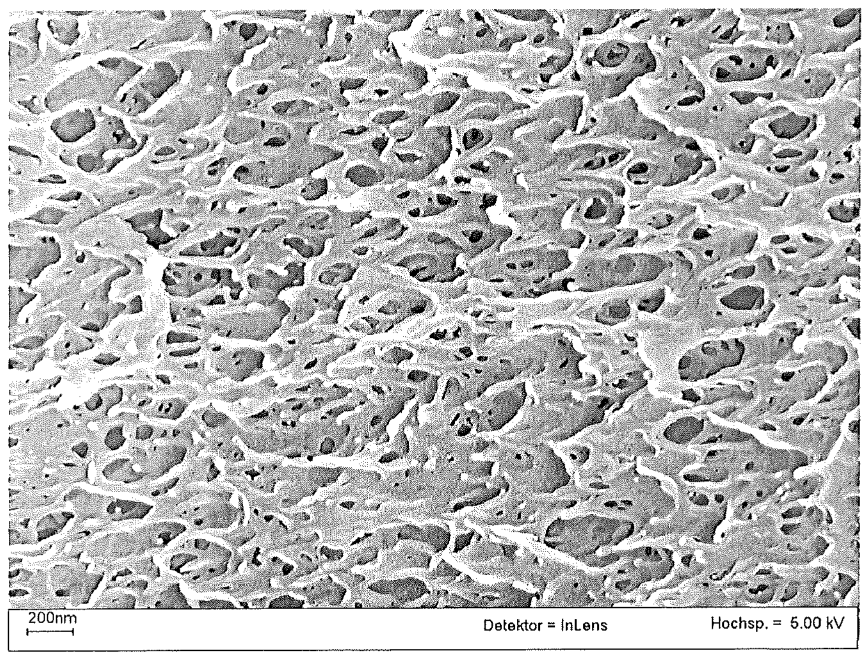
FIG. 8 illustrates a scanning electron micrograph of the nanoporous foam from example 8.

Preferably, the polymer melt laden in stage a) is heated such that the temperature at the instant of foaming lies in the range from −20 to +35° C. around the glass transition temperature of the unladen polymer melt. Especially preferred is a temperature range which deviates by about 0 to +30° C. from the glass transition temperature of the pure polymer.

The determinable glass transition temperature is described as the glass transition temperature. The glass transition temperature can be determined by means of DSC according to DIN-ISO 11357-2 at a heating rate of 20 K/min.

By means of the process according to the invention, nanoporous polymer foams with an average cell count in the range from 1,000 to 100,000 cells/mm, preferably from 2,000 to 50,000 and especially preferably from 5,000 to 50,000 cells/mm, and a foam density in the range from 10 to 500 kg/m$^3$, preferably in the range from 10 to 300 kg/m$^3$, especially preferably in the range from 10 to 250 kg/m$^3$, are produced.

According to the invention, the term "nanoporous" comprises pore sizes in the range from 5 to 1000 nanometers.

According to the invention, the term "average cell size" describes the average diameter of spherical foam cells with cross-sectional areas equivalent to the real cells in typical frequency/size curves, such as can be determined from evaluation of at least 10 real cell areas from representative electron micrographs.

According to the invention, the term "foam density" or also "density" describes the mass to volume ratio of the foamed nanoporous molding compound, which can be determined by the buoyancy method or is obtained by calculation from the mass to volume quotient of a molded part.

According to the invention, the term "molding compound" or also "polymer melt" includes both pure homo- and also copolymers and mixtures of polymers. Furthermore, the term also includes formulations which are based on polymers and a great variety of additives. For example, mention may be made here merely of process additives such as for example stabilizers, flow aids, color additives, antioxidants and similar additives well known to those skilled in the art.

The foams can be closed-cell, but are preferably open-cell. "Closed-cell" means that a discontinuous gas phase and a continuous polymer phase are present.

"Open-cell" means that there is a bicontinuous system, in which the gas phase and the polymer phase are each continuous phases, the two phases being interpenetrating phases.

The nanoporous systems have an open cell content (according to DIN-ISO 4590) of more than 40%, preferably more than 50%, especially preferably more than 75%. In the ideal case, at least 90% if not indeed practically all cells are open, i.e. the foam structure consists only of webs.

In the first stage (stage a)), a polymeric molding compound (polymer melt) is loaded with a gas or a fluid as propellant under a pressure and at a temperature at which the propellant is in the supercritical state.

As thermoplastic polymers for the polymer melts, for example styrene polymers, polyamides (PA), polyolefins, such as polypropylene (PP), polyethylene (PE) or polyethylene-propylene copolymers, polyacrylates, such as polymethyl methacrylate (PMMA), polycarbonate (PC), polyesters, such as polyethylene terephthalate (PET) or polybutylene terephthalate (PBT), polysulfones, polyether sulfones (PES), polyether ketones, polyether imides or polyether sulfides (PES), polyphenylene ether (PPE) or mixtures thereof can be used. Especially preferably, styrene polymers, such as polystyrene or styrene-acrylonitrile copolymers or polyacrylates such as polymethyl methacrylate are used.

Thermoplastically workable amorphous polymers, in which not more than 3% of crystalline components are present (determined by DSC) are particularly suitable as polymers.

Solid, gaseous or liquid propellants such as carbon dioxide, nitrogen, air, noble gases such as for example helium or argon, aliphatic hydrocarbons such as propane, butane, partially or completely halogenated aliphatic hydrocarbons, such as (hydro)fluorocarbons, (hydro)chlorofluorocarbons, difluoroethane, aliphatic alcohols or dinitrogen oxide (laughing gas) are suitable as propellants, carbon dioxide, laughing gas and/or nitrogen being preferred. Carbon dioxide is quite especially preferred.

According to the invention, this means that the propellant can be dispensed and/or injected directly supercritically, or the process parameters of the polymer to be injected at the time of injection lie in a range such that the propellant becomes supercritical under these conditions. For $CO_2$ for example, the critical point lies at about 31° C. and 7.375 MPa; for $N_2O$ for example the critical point lies at about 36.4° C. and 7.245 MPa.

The propellant loading of the polymeric molding compound or melt can according to the invention be effected in a pressure chamber, e.g. an autoclave, or in a tool cavity or in an extruder. According to the invention, the exact temperature of the polymeric molding compound in this stage is unimportant, although a temperature over the critical temperature of the propellant and above the glass transition temperature of the polymeric molding compound is advantageous for this first loading step, since the uptake of the propellant via diffusion processes is accelerated at temperatures above the glass transition temperature of the polymeric molding compound and hence shorter loading times are possible.

According to the invention, for the loading a pressure above the critical pressure of the propellant is set, preferably greater than 10 MPa, especially preferably greater than 20 MPa. This loading pressure is important for the generation of as high as possible a gas concentration in the polymeric molding compound, and in the context of the technical possibilities of present-day pressure vessels can be set at up to 200 MPa.

In one version according to the invention, the loading is effected in an extruder. In an advantageously configured version, the temperature of the polymeric molding compound in the region of the propellant injection is above the glass transition temperature of the molding compound, so that the propellant can distribute and dissolve very well and rapidly in the melt. The injection pressure during this is generally set higher than the melt pressure in this region. In an especially advantageous implementation, the injection pressure is set at a constant high value via a pressure maintaining valve. Thereby according to the invention a propellant mass flow which can amount to 1 to 60 wt. %, in particular 5 to 50 wt. % based on the mass flow of the polymeric molding compound is set. The upper limit for the propellant loading here is the saturation concentration attainable with the parameters pressure and temperature of the laden melt before the nozzle, which can either be determined empirically in the process or by gravimetric methods.

In a second stage (stage b)) of the processes according to the invention, while maintaining the loading pressure greater than 10 mPa, preferably greater than 20 mPa, the laden molding compound is cooled to a temperature which lies between −40 and +40° C., preferably between −20 and +35° C., especially preferably between 0 and 30° C. around the glass transition temperature of the unladen polymeric molding compound determinable by DSC according to DIN-ISO 11357-2 at a heating rate of 20 K/min.

In an implementation of the process according to the invention in the autoclave, this adjustment of the temperature of the polymeric molding compound can be effected after application of the loading pressure. Alternatively, this temperature can also already be set before application of the loading pressure. In both process versions, care must be taken to allow sufficient time for homogenization of the temperature, in particular after injection of the cold propellant into the cavity. Furthermore, in these process versions, care must be taken to allow sufficient time for attainment of the saturation concentration via diffusion, in particular at high volumes of the polymeric molding compound.

In a further version according to the invention in the extruder, the laden molding compound is continuously cooled. For this, all equipment known to those skilled in the art from a cooling extruder up to mixers and coolers can be used in any number and combination. In order to maintain the pressure in the laden molding compound, the use of melt pumps to increase the pressure, which can also be built into the process in any number and position, can be appropriate. An advantage of the implementation according to the invention is also based on this in that in fact a segmental buildup of the process line offers great control over the local parameters pressure and temperature and rapid and homogeneous cooling of the laden molding compound can be effected under pressure. It is however a condition that through a sufficient residence time and thorough mixing a homogeneous distribution of the propellant molecules is effected and the propellant can be completely dissolved in the polymeric molding compound.

Surprisingly, the inventors' experimental studies have shown that, contrary to general expert opinion, a rapid depressurization of a polymeric molding compound laden and heated according to the invention leads in the third stage (stage c)) to stable nanoporous polymer foams of low density.

A third stage (stage c)) is a depressurization where the polymer melt laden with propellant in stage a) and heated in stage b) is depressurized at a depressurization rate in the range from 15,000 to 2,000,000 MPa/sec. The depressurization rate relates to the pressure jump which takes place within a period of one second prior to frothing. In this case, the pressure drop is at least 10 MPa.

The pressure before the depressurization can be determined via a pressure sensor. Depressurization is usually to atmospheric pressure. However, a slight overpressure or underpressure can also be applied. In general, the reduction drop takes place jumplike within 0.1 to 10 ms. The depressurization rate can be determined, for example, by applying a tangent in the region of the steepest pressure drop in the pressure-temperature diagram.

In the continuous embodiment involving the use of an extruder, the depressurization rate is typically set via the shape of the nozzle. A nozzle which is generally used for this has at least one nozzle section which preferably has a length of 1 to 5 mm and a cross section of 0.1-25 $mm^2$.

By setting a depressurization rate in the range from 15,000 to 2,000,000 MPa/s, preferably in the range from 30,000 to 1,000,000 MPa/s, particularly preferably in the range from 40,000 to 500,000 MPa/s, a polymeric molding compound with very high propellant concentration and correspondingly low viscosity can be produced even with homogeneous foam temperatures above the glass transition temperature of the non-laden molding compound to give a nanoporous foam morphology with at the same time markedly lower foam density. It has been determined that depressurization rates of up to 200,000 MPa/s can be sufficient in some cases. In these cases, the process can be carried out in a simplified manner.

According to the invention, this third stage (stage c)) can be effected in different ways in the different process versions. In a version in the autoclave, the depressurization rate according to the invention can if desired be ensured via rapidly switching valves or via the controlled operation of depressurization devices such as for example a bursting disk. In a version according to the invention in a tool cavity, the depressurization rate can be achieved through rapid expansion of the cavity.

In the preferred implementation according to the invention in an extruder, the depressurization rate is ensured by the discharge capacity of the extruder and the nozzle geometry.

The present invention further relates to other technically usable equipment and methods familiar to those skilled in the art for the production of such nanoporous polymer foams by the aforesaid rapid depressurization according to the invention of a polymeric molding compound heated according to the invention.

Depending on the nozzle geometry used, particularly in the extrusion process, foam structures and finally polymer foams of various shapes can be produced. In preferred implementations of the process according to the invention, solid profiles, for example plates or else hollow profiles are produced.

In an also preferred configuration of the process according to the invention, in a further process step (optional stage d)) the polymer foam is comminuted into molded bodies in the form of foamed polymer particles, granules or powders, e.g. by means of a cutting disk, a granulator, a blade, a fly cutter or a mill. The comminution step here can preferably be attached directly after the depressurization, but can also be performed separately at a later time. During this, it can be advantageous to cool the polymer foam, for example with ice-water, dry ice or liquid nitrogen.

The comminution in stage d) can be effected in one or more stages, in the latter case in one or more different apparatuses. For example, the nanoporous polymer foam can be subjected first to a precomminution and then to a postcomminution. A postcomminution can advantageously be effected in a cutting mill or a moving bed countercurrent jet mill. The average diameter of the foam particles after comminution is preferably in the range from 10 μm to 10 mm and more preferably in the range from 0.1 to 1 mm.

Useful apparatuses for comminution include especially screw comminutors, rotary shears, single-shaft and multi-shaft comminutors, roll mills, fine mills, pulverizers, impact disk mills, hammer mills and moving bed countercurrent jet mills.

Processes and apparatuses for comminution of organic materials are widely known to those skilled in the art. A person skilled in the art selects a suitable apparatus as a function of the amount to be comminuted, the desired throughput, the particle size to be achieved and the brittleness of the material used.

The pulverulent or granular nanoporous polymer foams thus obtained, or materials comprising the pulverulent or granular nanoporous polymer foams, can also be preferably used as thermal insulants.

Powder beds for insulation applications such as blow-in insulation for example are already known to those skilled in the art. However, it has been possible to date to process organic materials in the form of foams into powders and/or beds without adversely affecting the favorable thermal insulation properties of the underlying porous material. In the case of known organic porous materials, the pore structure is completely destroyed after comminution.

Known inorganic porous materials likewise do not permit a sufficiently free choice of the particle size, limiting employability. For example, fumed silicas as porous materials are generally generated as a fine dust, so that pressing and/or adhesive bonding is required for many applications.

The flowability and low density of the nanoporous polymer foam both in the loose bed and in the compacted state are of great advantage in later use. The particle diameters, which can be set to specific values in a controlled manner, and also their size distribution through choice of the comminution process are a further advantage of loose beds.

The pulverulent or granular nanoporous polymer foams can be used as such, or in mixture with further functional components, as thermal insulants. A thermal insulant is accordingly an admixture comprising the pulverulent or granular nanoporous polymer foams. The selection of suitable functional components as added substances depends on the field of use.

The invention also relates to building materials and vacuum insulation panels comprising the pulverulent or granular nanoporous polymer foams and also to the use of the pulverulent or granular nanoporous polymer foams for thermal insulation. The materials obtainable are preferably used for thermal insulation particularly in built structures, or for cold insulation particularly in the mobile, logistical or stationary sector, for example in refrigerating equipment or for mobile applications.

Possible further components for these thermal insulants are for example compounds capable of absorbing, scattering and/or reflecting thermal radiation in the infrared range, particularly in the wavelength range between 3 and 10 μm. They are generally referred to as infrared opacifiers. The particle size of these particles is preferably in the range from 0.5 to 15 micrometers. Examples of substances of this kind are particularly titanium oxides, zirconium oxides, ilmenites, iron titanates, iron oxides, zirconium silicates, silicon carbide, manganese oxides, graphites and carbon black.

Fibers can be used for mechanical reinforcement as added substances. These fibers can be of organic or inorganic origin. Examples of inorganic fibers are preferably glass wool, rock wool, basalt fibers, slag wool, ceramic fibers consisting of melts of aluminum and/or silicon dioxide and also further inorganic metal oxides, and purely silicon dioxide fibers such as silica fibers for example. Organic fibers are preferably cellulose fibers, textile fibers or polymeric fibers for example. The following dimensions are used: diameter preferably 1-12 micrometers and particularly 6-9 micrometers; length preferably 1-25 mm and particularly 3-10 mm.

Inorganic filling materials can be added to the mixture for technical and economic reasons. It is preferable to use various, synthetically produced polymorphs of silicon dioxide such as, for example, precipitated silicas, electric-arc silicas, $SiO_2$-containing fly dusts formed by oxidations of volatile silicon monoxide, in the electrochemical production of silicon or ferrosilicon. Likewise silicas prepared by leaching of silicates such as calcium silicate, magnesium silicate and mixed silicates such as, for example, olivine (magnesium iron silicate) with acids. Naturally occurring $SiO_2$-containing compounds such as diatomaceous earths and kieselguhr are also used. It is likewise possible to use: thermally expanded minerals such as preferably perlites and vermiculites. If required, preferably finely divided metal oxides such as preferably aluminum oxide, titanium dioxide and iron oxide can be added.

The admixing of the thermal insulants can generally take place in diverse mixing assemblies. However, planetary mixers are preferably used. It is advantageous here to first pre-mix the fibers with a portion of the second mixing component as a kind of masterbatch to thereby ensure complete destructuralization of the fibers. After fiber destructuralization, the largest portion of the mixing component is added.

On completion of the mixing operation the bulk density of the mixture can be between preferably 40-180 kg/m$^3$ and more preferably 40-120 kg/m$^3$, depending on component type and quantity. The flowability of the resulting porous mixture is very good, such that it can, inter alia, also be introduced and pressed, for example, into the cavities of hollow bricks without any problem and homogeneously, having been pressed into plates. In the course of pressing into plates, by specifying particular plate thicknesses, via the weight, the density and consequently also the coefficient of thermal conductivity of the insulant can be influenced significantly.

The materials used in thermal insulants are preferably used in the following fields of application: as insulation in hollow bricks, as core insulation in multishell bricks, as core insulation for vacuum insulation panels (VIPs), as core insulation for exterior insulation finishing systems (EIFS), and as insulation in cavity walls, particularly in blow-in insulation.

The present invention further provides vacuum insulation panels comprising the pulverulent or granular nanoporous polymer foams. In addition, the en thermal insulants and the pulverulent or granular nanoporous polymer foams are particularly useful for the insulation of extruded hollow profiles, especially as core material for insulation in window frames.

Very good insulation performance is shown particularly by the so-called vacuum insulation panels, VIPs for short. Having a thermal conductivity of about 0.004 to 0.008 W/mK (depending on core material and vacuum), vacuum insulation panels provide 8 to 25 times better thermal insulation performance than conventional thermal insulation systems. They accordingly allow slim-line structures with optimum thermal insulation performance, which can be used not only in the building construction sector but also in the household appliance, refrigeration and logistics sectors as well as in automotive or more general vehicle building.

Vacuum insulation panels based on porous thermal insulants, polyurethane foam plates and pressed fibers as core material with composite foils (e.g., aluminum composite foils or so-called metalized films) are common general knowledge and have been extensively described.

A further disadvantage of current vacuum insulation panels is the missing combination of low thermal conductivity at moderate pressures and at low densities of the core materials below 200 kg/m$^3$. The use of the nanoporous polymer foams as core thermal insulant in vacuum insulation panels provides an optimum combination of thermal conductivity at low pressure, durability and low density as a function of the parameters of cell size and foam density and also the set particle size and particle size distribution. When used as core materials, the pulverulent or granular nanoporous polymer foams can be used directly as a loose bed or as a pressed molding.

EXAMPLES

Inputs

PMMA 6N: Plexiglass 6N PMMA from Evonik Röhm GmbH with a glass transition temperature of about 102° C. (measured by DSC to ISO 11357-2, heating rate: 20K/min)

PMMA 5N Plexiglass 5N PMMA from Evonik Röhm GmbH with a glass transition temperature of about 98° C. (measured by DSC to ISO 11357-2, heating rate: 20K/min)

PS156F Empera 156F polystyrene from Ineos Styrencis International SA with a glass transition temperature of 102° C. (measured by DSC to ISO 11357-2, heating rate: 20K/min)

Examples 1-15

Autoclave

For the following examples the polymers listed in Table 1 were used. After predrying of the granules for 3 hrs at 80° C. in the vacuum oven, about 200 mg of polymer in the form of granules in an in-house constructed, heatable vertical steel autoclave with an internal volume of about 2.5 ml were brought to the foam temperatures stated in the relevant example. At the upper end, this autoclave is equipped with a pressure sensor which measures the internal pressure at a rate of 1/ms. Pressure and temperature were continuously recorded via a computer and could then be evaluated.

Here it should be noted that the foam temperature was taken as the directly measured temperature of the bursting disk located below, on which the polymer lay. By means of an automatic motor-driven pump (SITEC model C) the relevant propellant in the supercritical state was then pumped in and the relevant loading pressure applied. To compensate for temperature fluctuations, the pressure was readjusted within the first 2 hours until a stable equilibrium state and a stable temperature of the bursting disk had been established.

In order to ensure sufficient time for the uptake of the propellant via diffusion processes, the sample was saturated for about 15 to 24 hrs under constant conditions, even when an equilibrium state was already established after a shorter time.

For the foaming of the molding compound laden and heated, the pressure of the supercritical propellant in the chamber was then increased via the motor-driven pump over a period of a few seconds until attainment of the failure pressure of the bursting disk. The depressurization rate was then determined by evaluation of the pressure data of the sensor. In this, a linear pressure drop was assumed. All the foaming experiments showed an almost complete pressure drop in the region of 2 ms, while the fall below the saturation pressure decisive for the cell nucleation took place even more rapidly.

After emergence from the pressure chamber through the hole forming in the bursting disk, the foamed sample was captured in a water-soaked sponge ca. 50 cm below the original position and could be stably handled and examined directly after the foaming process.

The density of the foamed molded bodies was determined by the buoyancy method, while the cell parameters such as the average cell diameter were determined by evaluation of scanning electron micrographs of at least 2 places in the foam. For the statistical evaluation, pictures with at least 10 whole cells in the picture detail were used.

In examples 1-15, an optically homogeneous, translucent nanoporous foam with an average density in the range from 100-300 kg/m$^3$ and an average cell diameter in the range from 40-210 nm was obtained. The polymer foams had a markedly bluish appearance under incident light, and appeared slightly reddish to transparent in transmitted light.

Scanning electron micrographs are shown in FIGS. 1-11.

TABLE 1

Process parameters:

| Example | Polymer | Propellant | Saturation pressure [bar] | Bursting disk temperature [° C.] | Saturation time [hr] | Failure pressure [bar] | Pressure drop rate [GPa/s] |
|---|---|---|---|---|---|---|---|
| 1 | PMMA 6N | CO2 | 777 | 122 | 22 | 956 | 47 |
| 2 | PMMA 6N | CO2 | 758 | 109 | 22 | 847 | 41 |
| 3 | PMMA 6N | CO2 | 762 | 95 | 22 | 937 | 46 |
| 4 | PMMA 6N | CO2 | 500 | 127 | 22 | 752 | 38 |
| 5 | PMMA 6N | CO2 | 400 | 101 | 21 | 803 | 40 |
| 6 | PMMA 6N | CO2 | 400 | 87 | 22 | 804 | 26 |
| 7 | PMMA 6N | CO2 | 356 | 130 | 22 | 429 | 17 |
| 8 | PMMA 6N | N2O | 345 | 130 | 22 | 429 | 18 |
| 9 | PMMA 6N | N2O | 707 | 130 | 22 | 827 | 41 |
| 10 | PMMA 5N | CO2 | 750 | 85 | 22 | 850 | 42 |
| 11 | PMMA 5N | CO2 | 735 | 105 | 22 | 923 | 46 |
| 12 | PMMA 5N | CO2 | 750 | 123 | 22 | 897 | 45 |
| 13 | PS 156F | CO2 | 600 | 129 | 15 | 750 | 37 |
| 14 | PS 156F | CO2 | 700 | 128 | 19 | 769 | 38 |
| 15 | PS 156F | CO2 | 750 | 129 | 18 | 805 | 40 |

TABLE 2

Average density and average cell diameter of the nanoporous foams of examples 1-15

| Example | Average density [kg/m$^3$] | Average cell diameter [nm] | Figure |
|---|---|---|---|
| 1 | 150 | 100 | 1 |
| 2 | 180 | 85 | 2 |
| 3 | 230 | 40 | 3 |
| 4 | 195 | 120 | 4 |
| 5 | 220 | 100 | 5 |
| 6 | 300 | 70 | 6 |
| 7 | 230 | 150 | 7 |
| 8 | 125 | 140 | 8 |
| 9 | 150 | 85 | |
| 10 | 270 | 80 | 10 |
| 11 | 214 | 100 | |
| 12 | 160 | 130 | |
| 13 | 220 | 210 | |
| 14 | 192 | 180 | |
| 15 | 189 | 150 | 11 |

Example 16

Extruder

In a preferred implementation according to the invention, a nanoporous polymer foam of low density was produced in a continuous extrusion process.

In this, a Plexiglass 6N PMMA from Evonik Röhm GmbH as supplied was used as the polymeric molding compound. In stage 1, the polymeric molding compound was melted and homogenized in an extruder (Leistritz 18 mm) at a flow rate of 2.26 kg/hr. Directly after the plasticization of the polymeric molding compound, supercritical CO2 at a pressure of about 475 bar was injected into the molding compound at a melt temperature of ca. 220° C. For this, a mass flow rate of about 0.780 kg/h CO2 was set, which results in a loading of about 34.5 wt. % based on the mass of polymer.

The laden molding compound was then lowered to a temperature of ca. 103° C. before the nozzle by means of mixing and cooling elements. The pressure along the process line after the propellant injection was kept above a minimum value of 350 bar by the use of melt pumps.

By extrusion of the laden molding compound under this pressure and at this overall mass flow rate through a round nozzle of 0.5 mm diameter and a length of 1.8 mm, a depressurization rate according to the invention of the polymeric molding compound heated according to the invention in the region of 80,000 MPa/s could be set.

In this process, a continuously extruded, optically homogeneous, translucent nanoporous polymer foam with an average foam density of about 200 kg/m$^3$ and an average cell diameter of about 100 nm was obtained. The polymer foam had a bluish appearance under incident light, and appeared slightly reddish in transmitted light.

Figure 9:
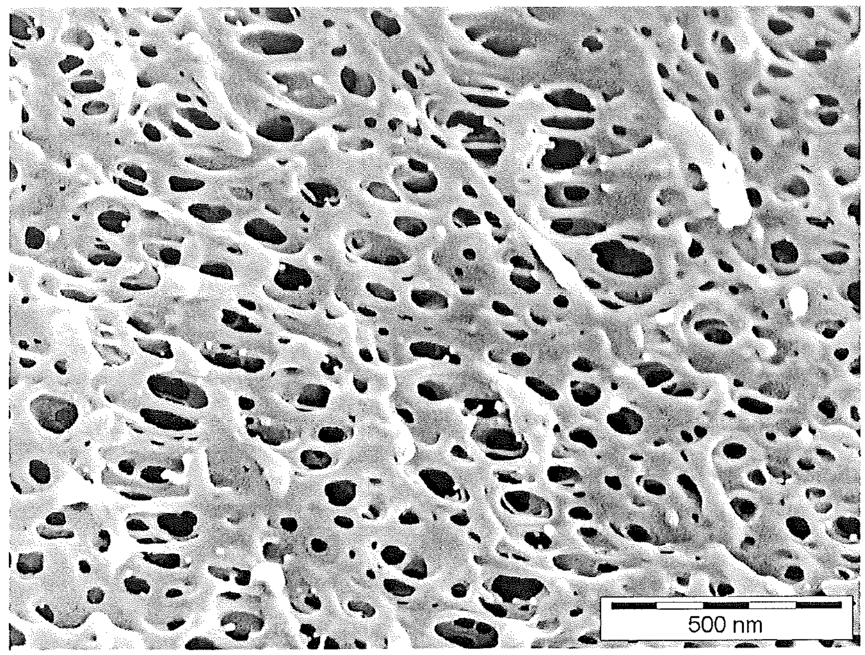
FIG. 9 illustrates a scanning electron micrograph of the nanoporous foam from example 16.
Figure 10:
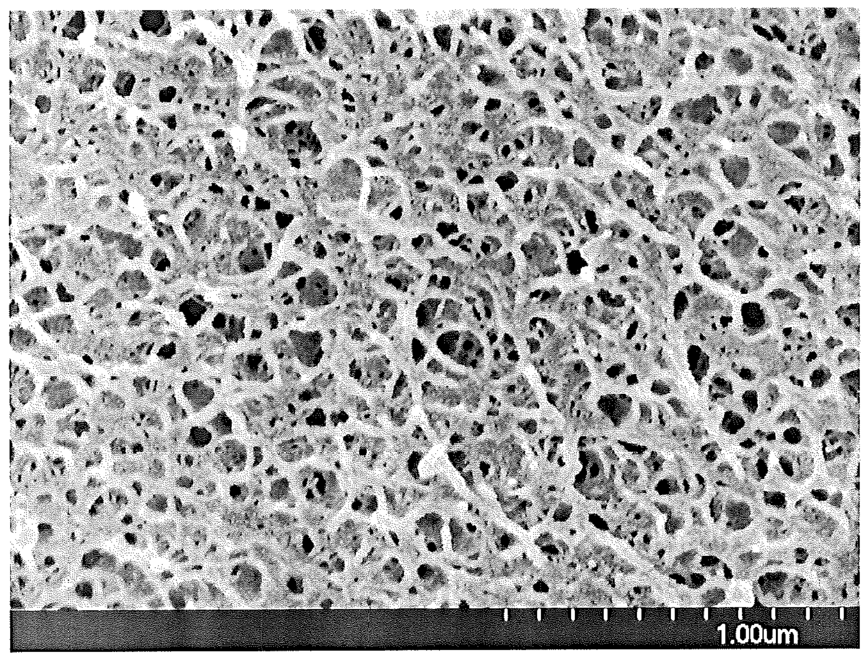
FIG. 10 illustrates a scanning electron micrograph of the nanoporous foam from example 10.
Figure 11:
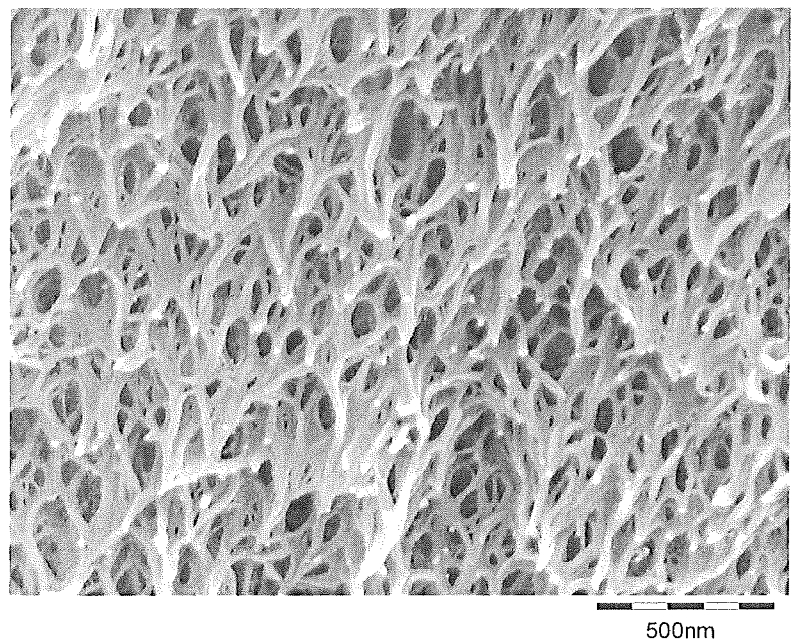
FIG. 11 illustrates a scanning electron micrograph of the nanoporous foam from example 15.

A scanning electron micrograph of the nanoporous foam from example 16 is shown in FIG. 9.

Example 17

Extruder

In a further preferred implementation according to the invention, a nanoporous polymer foam of low density was produced in a continuous extrusion process.

In this, a Plexiglass 6N PMMA from Evonik Röhm GmbH as supplied was used as the polymeric molding compound. In stage 1, the polymeric molding compound was melted and homogenized in an extruder (Leistritz 18 mm) at a flow rate of 1.8 kg/h. Directly after the plasticization of the polymeric molding compound, supercritical CO2 at a pressure of about 470 bar was injected into the molding compound at a melt temperature of about 220° C. For this, a mass flow rate of about 0.745 kg/h CO2 was set, which results in a loading of about 41.4 wt. % based on the mass of polymer.

The laden molding compound was then lowered to a temperature of about 100° C. before the nozzle by means of mixing and cooling elements. The pressure along the process line after the propellant injection was kept above a minimum value of 375 bar by the use of melt pumps.

By extrusion of the laden molding compound under this pressure and at this overall mass flow rate through a round nozzle of 0.3 mm diameter and a length of 1.57 mm, a depressurization rate in the region of 270,000 MPa/s of the heated polymeric molding compound could be set.

In this process according to the invention, a continuously extruded, optically homogeneous, translucent nanoporous polymer foam with an average foam density of about 180 kg/m$^3$ and an average cell diameter of about 90 nm was obtained. The polymer foam had a bluish appearance under incident light, and appeared slightly reddish in transmitted light.

Figure 12:
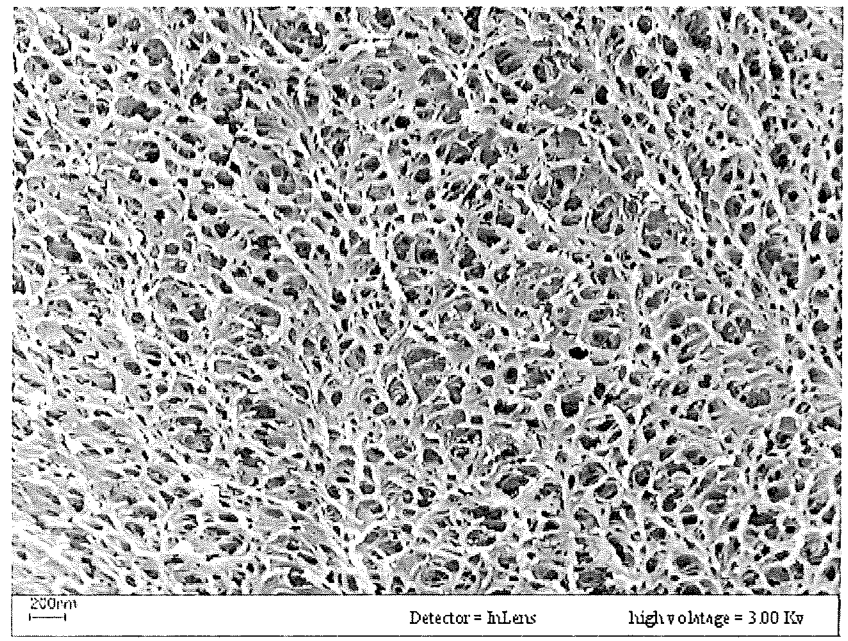
FIG. 12 illustrates a scanning electron micrograph of the nanoporous foam from example 17.

A scanning electron micrograph of the nanoporous foam from example 17 is shown in FIG. 12.

The invention claimed is:

1. A process for the production of a nanoporous polymer foam, comprising the stages a) loading a polymer melt formed from thermoplastic polymers with a propellant under a pressure and at a temperature at which the propellant is in the supercritical state, b) heating of the laden polymer melt to a temperature which lies in the range from 40° C. under to 40° C. over the glass transition temperature of the unladen polymer melt determinable by DSC according to DIN-ISO 11357-2 at a heating rate of 20 K/min, and c) depressurizating the polymer melt laden in stage a) and heated in stage b) with a depressurization rate in the range from 15,000 to 2,000,000 MPa/sec.

2. The process according to claim 1, wherein the loading and the heating of the polymer melt are performed continuously in an extruder and the depressurization is effected via a nozzle.

3. The process according to claim 1, wherein the thermoplastic polymer is polystyrene, polymethyl methacrylate (PMMA), polycarbonate, styrene-acrylonitrile copolymers, polysulfone, polyether sulfone, polyether imide or mixtures thereof.

4. The process according to claim 2, wherein the thermoplastic polymer is polystyrene, polymethyl methacrylate (PMMA), polycarbonate, styrene-acrylonitrile copolymers, polysulfone, polyether sulfone, polyether imide or mixtures thereof.

5. The process according to claim 3, wherein the laden polymer melt is heated in stage b) to a temperature in the range from 50 to 250° C.

6. The process according to claim 4, wherein the laden polymer melt is heated in stage b) to a temperature in the range from 50 to 250° C.

7. The process according to claim 1, wherein the pressure lies in the range from 20 to 200 MPa in step a) and in the range from 0.01 to 1 mPa (absolute) after the depressurization.

8. The process according to claim 6, wherein the pressure lies in the range from 20 to 200 MPa in step a) and in the range from 0.01 to 1 mPa (absolute) after the depressurization.

9. The process according to claim 1, wherein said propellant is carbon dioxide ($CO_2$) gas or dinitrogen oxide ($N_2O$) gas.

10. The process according to claim 8, wherein said propellant is carbon dioxide ($CO_2$) gas or dinitrogen oxide ($N_2O$) gas.

11. The process according to claim 1, wherein the process additionally comprises a stage d) comminuting the nanoporous polymer foam obtained in stage c) to foam particles having an average particle diameter in the range from 10 μm to 10 mm.

12. The process according to claim 10, wherein the process additionally comprises a stage d) comminuting the nanoporous polymer foam obtained in stage c) to foam particles having an average particle diameter in the range from 10 μm to 10 mm.

13. The process according to claim 1, wherein the polymer foam has a cell count which lies in the range from 1,000 to 100,000 cells/mm and the density in the range from 10 to 500 kg/m$^3$.

14. The process according to claim 12, wherein the polymer foam has a cell count which lies in the range from 5,000 to 50,000 cells/mm and the density in the range from 10 to 250 kg/m$^3$.

* * * * *